United States Patent [19]
Ormanns et al.

[11] Patent Number: 4,870,700
[45] Date of Patent: Sep. 26, 1989

[54] PERSONAL SAFETY RADIO DEVICE

[75] Inventors: Siegfried Ormanns, Gelsenkirchen; Hans J. Schwalb, Gladbeck, both of Fed. Rep. of Germany

[73] Assignee: Selectronic Fund und Sicherheitsctechnik GmbH, Huenstetten, Fed. Rep. of Germany

[21] Appl. No.: 134,221

[22] Filed: Dec. 16, 1987

[30] Foreign Application Priority Data

Dec. 18, 1986 [DE] Fed. Rep. of Germany ....... 3643238

[51] Int. Cl.⁴ ............................................. H03B 1/00
[52] U.S. Cl. ...................................... 455/92; 455/100
[58] Field of Search ...................... 455/88, 89, 90, 95, 455/92, 100, 127, 128, 343, 344, 351; 340/825.49, 825.45, 870.3, 825.54, 572, 573; 36/139, 137, 136; 320/61

[56] References Cited

U.S. PATENT DOCUMENTS

| | | | |
|---|---|---|---|
| 3,806,936 | 4/1974 | Koster | 455/100 |
| 3,825,833 | 7/1974 | Bogue | 455/100 |
| 4,001,798 | 1/1977 | Robinson | 340/870.3 |
| 4,402,524 | 9/1983 | D'Antonio | 320/61 |
| 4,412,355 | 10/1983 | Terbrack et al. | 455/127 |
| 4,430,757 | 2/1984 | Szakvary | 455/100 |
| 4,606,073 | 8/1986 | Moore | 455/89 |
| 4,703,445 | 10/1987 | Dassler | 340/323 R |
| 4,731,870 | 3/1988 | Black et al. | 455/127 |
| 4,736,196 | 4/1988 | McMahon | 455/100 |
| 4,736,312 | 4/1988 | Dassler et al. | 455/100 |

*Primary Examiner*—Michael J. Tokar
*Attorney, Agent, or Firm*—Blakely, Sokoloff, Taylor & Zafman

[57] ABSTRACT

The personal safety radio device is carried by the person to be protected on a mounting device, for instance incorporated in the heel of a work shoe, and includes a transmitter powered by a current source specific to the device, a receiver and an antenna arrangement. In order to ensure a high operational reliability and a long maintenance-free service life at a high range of transmission the device- specific current source is a rechargeable accumulator which may be charged by a generator arrangement including a piezo-electric converter during the operational useage of the device. The piezo-electric converter is so arranged in the work shoe that it is acted on by the weight of the person wearing the work shoe and thus converts the pressure of the weight into electrical energy.

11 Claims, 1 Drawing Sheet

PERSONAL SAFETY RADIO DEVICE

BACKGROUND OF THE INVENTION

1. Field of the Invention

The invention relates to the field of personal safety and personnel location, particularly to a personal safety radio device which is carried by the person to be protected on a mounting device and includes a transmitter powered by a current source specific to the device and an antenna arrangement.

2. Prior Art

Radio apparatus for personal safety or work safety can be divided into two categories in accordance with their function. In one category, a self-excited transmitter, which as a rule is permanently active and which is carried by the person to be protected either in a shoe, a belt or when used underground in the cap lamp, serves to mark the person (German patent No. 2026167). The permanently active transmitter continuously emits a high frequency signal which actuates a signal receiver and the switching device connected thereto when it is received by a receiving antenna which as a rule is stationarily disposed in the danger or monitoring region. By reason of the constant energy consumption the operational life is limited even with modern, high-power batteries. The current source and its energy consumption constitute a considerable operational risk when continuously operated for long periods of time, particularly with devices for personal safety and for the location of people who are buried alive or trapped in underground operations, building works or in areas endangered by avalanches.

The second category relates to so-called passive danger signal transmitters without their own energy source. The danger signal transmitter includes a transceiver which is excited in a predetermined transmission range of a transmitter by a certain transmission frequency and emits a response signal on a different frequency. A danger signal receiver generates alarm or cut-off signals from the response frequency. The advantage of these devices resides in the independence of the transceiver of an energy supply. The substantial disadvantage of purely passive transceivers is known to lie in the fact that their transmission range is too small. Due to this disadvantage the use of purely passive transceivers for marking people who have been buried alive, particularly in underground operations, is too risky.

BRIEF DESCRIPTION OF THE INVENTION

The object of the invention is to provide a personal safety radio device of the type described above that combines the advantages of a large transmission range, a compact construction, a high operational reliability and a long maintenance-free service life.

According to the invention this object is solved if the device-specific current source is a rechargeable accumulator and if the accumulator is connected to a generator arrangement of such a construction that it can be charged by the generator arrangement during the operational use.

Proven accumulator cells are used in the invention which ensure a practically constant voltage and energy output which is substantially independent of the circumstances of their use. Their service life is extended by the generator arrangement by automatic charging in operational use. In conventional personal safety radio devices the batteries are constantly discharged in operational use. The invention thus uses the transmission range of self-powered personal safety radio devices which is known to be large but increases their reliability and their service life by constant operational charging. The field of use of the personal safety radio devices is thus not inconsiderably extended and covers all marking and locational duties, in particular under the difficult circumstances of underground recovery operations. Trapped and buried people can thus be located from large distances and rapidly liberated, if desired, if they are carrying the new personal safety radio device.

In a preferred embodiment of the invention the generator arrangement has a pressure converter, particularly a piezo-electric converter. This is incorporated in the sole or heel region of a shoe or boot in such a manner that it receives part of the sole or heel pressure when the person to be protected is walking and converts it into a voltage to charge the accumulator. Such piezo-electric converters can however be arranged in other articles of clothing, e.g. on the buckle of a so-called radio safety belt. In this embodiment the pressure-sensitive membrane of the piezo-electric cell is so disposed on the inner wall of the belt buckle that it is subject to a changing pressure which can thus be converted into a voltage by the stomach muscles (for instance when breathing).

The accumulator cells, constructed for instance as small button cells, situated in this device require a certain minimum charging voltage. Under certain circumstances, for instance when the pressure converter is disposed on the belt buckle, this minimum voltage can not be produced by a single piezo-electric cell. The invention thus provides that a plurality of piezo-electric cells are connected in parallel and/or in series.

In an alterntive embodiment the generator arrangement can include an inductive converter which may be excited by movement energy including at least one magnetic core and an induction coil surrounding it, whereby one of the components comprising the magnetic core and induction coil is fixedly arranged and the other component is moveably arranged in the mounting device of the personal safety radio device for producing an induction voltage. The induction voltage is applied to the accumulator via a rectifier circuit in order to rectify it to charge the accumulator.

Either alternatively or additionally to the energy sources referred to above the generator arrangement can have an induction coil in which a current may be induced to charge the accumulator by flux linkage with an external field. In underground use such a field can be produced, for instance, in a monitoring station and made effective on walking through a monitoring zone, optionally in conjunction with an examination of the personal safety radio device.

In a further embodiment of the invention the generator circuit has a voltage amplifying and/or limiting circuit to avoid over-voltages when charging the accumulator.

DETAILED DESCRIPTION OF THE INVENTION

A personal safety radio device will be described which is carried in its entirety in an article of clothing, particularly in a shoe or belt, and has at least one current source, a transmitter and an antenna. In the following description specific details are described to render a thorough understanding of the invention possible. It will be clear to the expert that the invention may be realised without these particular details. On the other hand, known circuits and circuit components are illustrated as blocks and are not described in detail so that the invention is not unnecessarily obscured.

Figure 1:
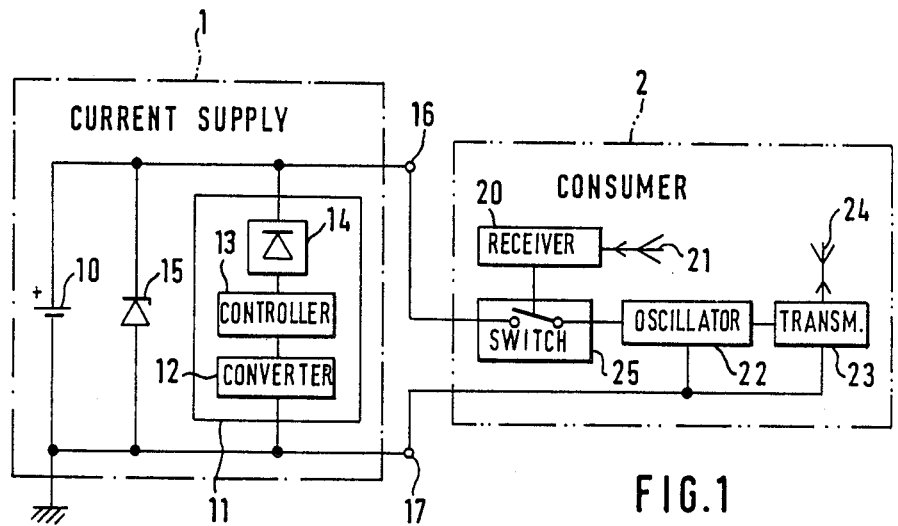
FIG. 1 is a schematic block circuit diagram of an exemplary embodiment of the personal safety device in accordance with the invention.

The personal safety radio device illustrated in FIG. 1 as a block circuit diagram comprises a current supply portion 1 and a consumer 2.

The current supply 1 has a rechargeable accumulator 10 as the current source, for instance in the form of a commercially available button cell and a generator arrangement 11. The latter is so constructed and connected to the accumulator 10 that it can charge the accumulator with the necessary charging voltage. The generator arrangement 11 has a converter 12 which is so constructed that it can convert pressure energy acting on it or movement energy or the energy acting on it from the exterior via a suitable field into electrical energy to charge the accumulator 10. In a preferred exemplary embodiment the converter is constructed as a piezo-electric converter which is disposed in a suitable pressure pocket (FIG. 2) in the heel region of a work boot and, in use, is subjected to the heel pressure of the user. In an alternative construction the converter 12 can however be constructed as an inductive movement converter in which a magnetic core is arranged in a suitable induction coil and produces an induction voltage serving to charge the accumulator 10 by reason of movement relative to the induction coil within the latter. The necessary relative movement for producing the relative movement between the magnetic core and the induction coil is caused by the movement of the person carrying the device whilst working.

Connected to the converter 12 is a component 13 designated in FIG. 1 as a controller. The controller can be constructed as a voltage amplifier in order to increase the voltage produced in the converter 12, particularly in a purely inductive converter, to the voltage level necessary for the charging of the accumulator 10. If the converter is constructed as a piezo-electric cell or as a plurality of piezo-electric cells connected in series the voltage produced in the converter may under certain circumstances significantly exceed the necessary charging voltage. In this case the controller 13 preferably functions like a voltage limiter. The generator arrangement 11 further includes a rectifier 14 which is in series with the controller and the converter and prevents a discharge of the accumulator 10 through the generator current branch. In the illustrated exemplary embodiment a Zener diode 15 is additionally provided to limit any charging over-voltages.

The consumer 2 is connected to the two poles 16, 17 of the current supply 1. It includes a receiver 20 with a receiving antenna 21, an oscillator 22, a transmitter 23 with a transmitting antenna 24 and a switch 25, preferably of electronic type. The switch 25 is so arranged in the described exemplary embodiment that the consumer current circuit is open in the rest state and thus no discharge occurs through the consumer 2. For this purpose the switch 25 is constructed as a closing switch which is only closed on command by the receiver 20, i.e. on receipt of a suitable external command signal, for instance at a predetermined frequency. When the switch 25 is closed the oscillator 22 and the transmitter 23 are connected to the current supply 1 and withdraw the necessary electrical energy from the accumulator 10 for producing a transmission signal.

This signal is in practice of such a strength that it can reliably pass through a heap of debris of about 10 meters for the purpose of locating people who are buried or trapped. In this exemplary embodiment the consumer is switched off in normal operational use and uses no energy from the accumulator. Only when commanded and for the duration of receipt of an external command signal, e.g. of a predetermined frequency, is the transmitter 23 active and sends its signal via the transmission antenna 24. In an alternative embodiment the components 20, 22 and 23 can be supplied with a predetermined reduced amount of electrical energy in order to ensure permanent transmission operation at a lower transmission power. In this case the switch 25 should be manually operable whereby the consumer is disconnected from the current supply portion 1 when not in an operational period, that is to say in the rest state.

Figure 2:
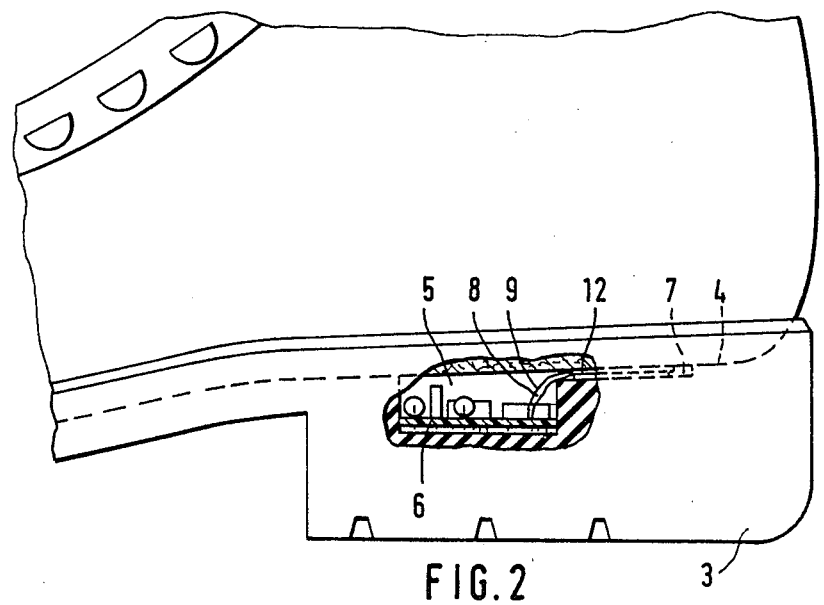
FIG. 2 is a scrap elevation of a work shoe used in underground operations, in the heel of which the personal safety radio device in accordance with the invention is incorporated.

The described personal safety radio device is shown in FIG. 2 incorporated in a shoe heel 3.

Within the shoe heel 3 and below an insole 4 a receiving recess 5 is provided in which a base plate 6 is arranged which carries the electrical components of the device including the accumulator element 10 in the form of a button cell.

The piezo-electric converter 12 is, as mentioned, so arranged in a heel pocket 7 directly below the insole 4 in such a manner that it is subjected to the heel pressure of the person to be protected via the insole 4 or a suitable pressure membrane. The pressure converter is electrically connected via two lines 8 and 9 to the negative pole of the accumulator or a connection o a suitable constructed controller.

The personal safety radio device in accordance with the invention is suitable in combination with an operational detection and monitoring installation also for the location of the person carrying the device in use, particularly in underground use. On walking through a lock or when passing barriers between individual operational areas the people can be counted and their residence time, particularly in dangerous areas, can be centrally monitored. In the event of danger it may be centrally determined in this manner which and how many people provided with protective radio devices are present in certain zones. For the purpose of calling people a decoder can be associated with the receiver which is responsive only to the frequency specific to that device. Additionally, a coder can be associated with the transmitter which provides the response signal with a code indicative of the identity of the person concerned.

We claim:
1. In combination with a shoe, a personal safety radio device comprising:
   transmission means for producing transmission signals;
   at least one rechargeable accumulator constituting a current source for supplying the transmission means;
   receiver means responsive to at least one predetermined frequency;

means for coupling the transmission means to the accumulator, said coupling means including a supply current circuit and switching means, wherein said receiver means is coupled to said switching means and actuates the switching means to activate the transmission means in order to close the supply current circuit between the accumulator and the transmission means when the at least one predetermined frequency is received by the receiver; and generator means coupled to the accumulator for charging the accumulator during use of the protective radio device, whereby a compact, mobile personal safety radio device having a high operational reliability and long service life is provided.

2. Personal safety radio device as claimed in claim 1 wherein the generator means includes a pressure converter, said pressure converter being integrated in said shoe in such a manner that it is acted on by weight of the person carrying the mounting device.

3. Personal safety radio device as claimed in claim 2 wherein the pressure converter is a piezo-electric converter which is so incorporated in a heel of the shoe that it is subject to part of the heel pressure when the person to be protected walks and converts it into an electrical voltage to charge the accumulator.

4. Personal safety radio device as claimed in claim 3 wherein the piezo-electric converter is provided with a plurality of piezo-electric cells electrically coupled together.

5. Personal safety radio device as claimed in claim 1 wherein the generator means includes an induction coil in which a current for charging the accumulator can be induced by flux linkage with an external field.

6. Personal safety radio device as claimed in claim 1 further including a rectifying circuit coupled both to said generator means and also to said rechargeable accumulator for rectifying the electrical voltage produced by the generator means and applied to the accumulator.

7. Personal safety radio device as claimed in claim 6 wherein a voltage controller is associated with the generator means.

8. Personal safety radio device as claimed in claim 7 wherein said voltage controller includes a voltage limiting circuit.

9. Personal safety radio device as claimed in claim 8 wherein a decoder for differentiating between received frequencies is associated with the receiver means.

10. Personal safety radio device as claimed in claim 7 wherein the receiver means is constructed as an externally excited component which switches the switching means on receipt of the predetermined frequency.

11. In combination with a mounting device which can be carried by a person, a personal safety radio device comprising:

transmission means for producing transmission signals;

antenna means coupled to the transmission means for emitting radio signals in dependence on said transmission signals;

at least one rechargeable accumulator constituting a current source for supplying the transmission means;

means for coupling the transmission means to the accumulator;

generator means coupled to the accumulator for charging the accumulator during use of the protective radio device in operational use, said generator means including an induction coil in which a current for charging the accumulator can be induced by flux linkage with an external field; and whereby a compact, mobile personal safety radio device having a high operational reliability and long service life is provided.

* * * * *

UNITED STATES PATENT AND TRADEMARK OFFICE
CERTIFICATE OF CORRECTION

PATENT NO. : 4,870,700
DATED : 09/26/89
INVENTOR(S) : Ormanns et al.

It is certified that error appears in the above-identified patent and that said Letters Patent is hereby corrected as shown below:

On the title page

[73] Assignee:

delete "Selectronic Fund und Sicherheitsctechnik"
    insert --Selectronic Funk- und Sicherheitstechnik GmbH--

Signed and Sealed this

Nineteenth Day of June, 1990

*Attest:*

HARRY F. MANBECK, JR.

*Attesting Officer*      *Commissioner of Patents and Trademarks*